(12) United States Patent
Suh et al.

(10) Patent No.: US 11,436,432 B2
(45) Date of Patent: Sep. 6, 2022

(54) METHOD AND APPARATUS FOR ARTIFICIAL NEURAL NETWORK

(71) Applicant: Samsung Electronics Co., Ltd., Suwon-si (KR)

(72) Inventors: Sangmin Suh, Seoul (KR); Sangsoo Ko, Yongin-si (KR); Byeoungsu Kim, Hwaseong-si (KR); Sanghyuck Ha, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 67 days.

(21) Appl. No.: 17/021,398

(22) Filed: Sep. 15, 2020

(65) Prior Publication Data
US 2021/0271927 A1 Sep. 2, 2021

(30) Foreign Application Priority Data
Feb. 27, 2020 (KR) ........................ 10-2020-0024485

(51) Int. Cl.
*G06K 9/62* (2022.01)
*G06N 3/04* (2006.01)

(52) U.S. Cl.
CPC ......... *G06K 9/6232* (2013.01); *G06K 9/6256* (2013.01); *G06N 3/04* (2013.01)

(58) Field of Classification Search
CPC ...... G06K 9/6256; G06K 9/6232; G06N 3/04; G06N 3/0445; G06N 3/0454; G06N 3/08; G06V 10/454; G06V 10/50; G06V 10/82; G06V 10/22; G06V 20/56; H04N 9/67

USPC ........................................................ 382/156
See application file for complete search history.

(56) References Cited

U.S. PATENT DOCUMENTS

| | | | |
|---|---|---|---|
| 7,593,561 B2 | 9/2009 | Zhang et al. | |
| 7,848,555 B2 | 12/2010 | Zhang et al. | |
| 8,798,375 B1 | 8/2014 | Chang et al. | |
| 9,275,282 B2* | 3/2016 | Das | G06V 30/418 |
| 9,965,719 B2 | 5/2018 | Choi et al. | |
| 10,298,859 B2 | 5/2019 | Frost et al. | |
| 10,339,421 B2* | 7/2019 | Mei | G06V 10/82 |
| 2018/0181799 A1 | 6/2018 | Yoo et al. | |
| 2019/0065884 A1 | 2/2019 | Li et al. | |
| 2019/0082185 A1 | 3/2019 | Satavalekar et al. | |
| 2019/0236411 A1 | 8/2019 | Zhu et al. | |
| 2020/0410636 A1* | 12/2020 | Kim | G06N 3/08 |
| 2021/0192687 A1* | 6/2021 | Liu | G06N 3/084 |
| 2021/0254992 A1* | 8/2021 | Zhou | G06K 9/6215 |
| 2022/0027737 A1* | 1/2022 | Dalli | G06N 3/0454 |

* cited by examiner

Primary Examiner — Juan A Torres
(74) Attorney, Agent, or Firm — Harness, Dickey & Pierce, P.L.C.

(57) ABSTRACT

An apparatus for an artificial neural network includes a format converter, a sampling unit, and a learning unit. The format converter generates a first format image and a second format image based on an input image. The sampling unit samples the first format image using a first sampling scheme to generate a first feature map, and samples the second format image using a second sampling scheme different from the first sampling scheme to generate a second feature map. The learning unit operates the artificial neural network using the first feature map and the second feature map.

20 Claims, 11 Drawing Sheets

METHOD AND APPARATUS FOR ARTIFICIAL NEURAL NETWORK

CROSS-REFERENCE TO RELATED APPLICATION

This U.S. non-provisional application claims priority under 35 USC § 119 to Korean Patent Application No. 10-2020-0024485, filed on Feb. 27, 2020, in the Korean Intellectual Property Office (KIPO), the disclosure of which is incorporated by reference herein in its entirety.

BACKGROUND

1. Technical Field

Example embodiments relate generally to an artificial neural network, and more particularly to a method and an apparatus for the artificial neural network.

2. Discussion of the Related Art

Artificial neural network are modeling techniques implemented in a complex network structure to emulate a human brain. The artificial neural network is often utilized for the classification and/or clustering of data by finding and/or recognizing specific patterns in data of various types, such as a still images, video images, text, sound, etc. Various studies have been conducted to develop methods to improve the extraction of feature maps from the data and/or to increase recognition of specific patterns.

SUMMARY

Some example embodiments may provide a method and an apparatus for an artificial neural network, capable of increasing a recognition rate of specific patterns.

According to some example embodiments, an apparatus for an artificial neural network includes a format converter, a sampling unit, and a learning unit. The format converter may be configured to generate a first format image and a second format image based on an input image. The sampling unit may be configured to sample the first format image using a first sampling scheme to generate a first feature map, and samples the second format image using a second sampling scheme different from the first sampling scheme to generate a second feature map. The learning unit may be configured to, using the first feature map and the second feature map, operate the artificial neural network.

According to some example embodiments, an apparatus for an artificial neural network includes a feature map providing unit and a learning unit. The feature map providing unit may be configured to generate a first format image and a second format image based on an input image, to generate a first feature map by sampling the first format image using a first sampling scheme, and to generate a second feature map by sampling the second format image using a second sampling scheme different from the first sampling scheme. The learning unit may be configured to operate the artificial neural network using the first feature map and the second feature map, generates error information by calculating an error based on the input image and an operation result of the artificial neural network, and transmits the error information to the feature map providing unit.

According to some example embodiments, a method for an artificial neural network includes, generating a first format image and a second format image based on an input image, sampling the first format image using a first sampling scheme to generate a first feature map, and sampling the second format image using a second sampling scheme different from the first sampling scheme to generate a second feature map, and operating the artificial neural network using the first feature map and the second feature map.

The method and the apparatus for the artificial neural network according to some example embodiments may generate a first format image and a second format image based on an input image. The method and the apparatus may generate various feature maps by sampling the first format image using the first sampling scheme, and sampling the second format image using the second sampling scheme. The method and the apparatus may operate the artificial neural network using the first feature map and the second feature map. As a result, it is possible to increase the recognition rate of the artificial neural network for specific patterns.

BRIEF DESCRIPTION OF THE DRAWINGS

Example embodiments of the present disclosure will be more clearly understood from the following detailed description taken in conjunction with the accompanying drawings.

DETAILED DESCRIPTION

Various example embodiments will be described more fully hereinafter with reference to the accompanying drawings, in which some example embodiments are shown. In the drawings, like numerals refer to like elements throughout. The repeated descriptions may be omitted.

Figure 1:
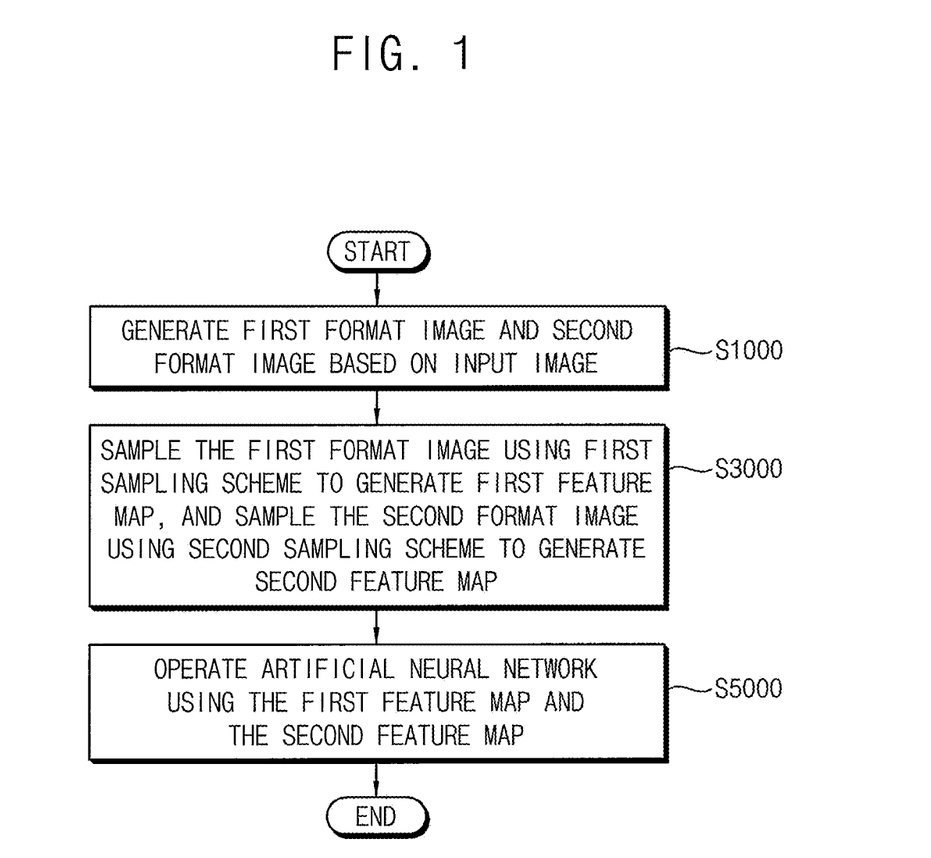
FIG. 1 is a flowchart illustrating a method for an artificial neural network according to some example embodiments.

FIG. 1 is a flowchart illustrating a method for an artificial neural network according to some example embodiments.

Referring to FIG. 1, a method for the artificial neural network may be performed by an apparatus for the artificial neural network described later with reference to FIGS. 2 and 3.

The apparatus of the artificial neural network may generate a first format image and a second format image from the input image to increase a recognition rate of a specific pattern in the input image (S1000). The input image may include, for example, a still image and/or a video image obtained through a camera including an image sensor, and/or an acoustic fingerprint of a sound obtained through an audio sensor. For example, the image sensor may include a complementary metal oxide semiconductor (CMOS) image sensor. The CMOS image sensor may convert a scene in a field of view into electrical analog signals, and convert the electrical analog signal into digital signal to generate the input image. The image sensor may be including, for example, not only in a traditional camera, but also a mobile phone, a smart phone, a tablet personal computer (PC), a laptop computer, a digital camera, a camcorder, a portable game console, a wearable device including the image sensor, and the like.

The input image may include, for example, an RGB image, an YCbCr image, and/or a YUV image having a resolution corresponding to the number of pixels of a pixel array included in the image sensor, but the scope of the present invention is not limited thereto. For example, in some example embodiments, the input image may be an MNIST data set of Cifar-10 data set that is widely used by persons having ordinary skill in the art of artificial neural networks.

The first format image may be an image obtained by processing the input image, and may be obtained by converting the format of the input image. In some example embodiments, when the input image is an RGB image, the first format image may include a Red (R) image, a Green (G) image, and a Blue (B) image. In some embodiments, when the input image is an YCbCr image, the first format image may include a luma (Y) image, a blue difference (Cb) image and a red difference (Cr) image. In some embodiments, when the image is a YUV image, the first format image may include a luma (Y) image, a blue projection (U) image, and a red projection (V) image.

The second format image may be an image obtained by processing the input image and/or the first format image, and may be an image obtained by converting the format of the input image or the first format image. In some example embodiments, the second format image may be an edge image generated based on at least one of the input image and/or the first format image. The edge image may be generated by applying a mask to at least one of the input image and the first format image. The mask may be, for example, predetermined and/or selected based on the image format. In some example embodiments, the mask may be a Sobel mask, but the scope of the present invention is not limited thereto. For example, in some example embodiments, the mask may be one of a Prewitt mask, a Robert mask, a Laplacian, a Laplacian Of Gaussian (LOG), a Difference Of Gaussian (DOG), or the like. In some embodiments, the edge image may be generated by applying a Canny Edge Detection algorithm to at least one of the input image and the first format image.

The apparatus for the artificial neural network may sample the first format image using a first sampling scheme to generate a first feature map, and sample the second format image using a second sampling scheme to generate a second feature map (S3000). A sampling scheme may be a scheme of selecting a portion of a plurality of pixels included in the first format image and the second format image. In some example embodiments, the sampling scheme may be a predetermined scheme and/or selected based on the first format image and/or the second image format. In some example embodiments, the sampling scheme may include first direction sampling information D1 and second direction sampling information D2, but the scope of the present invention is not limited thereto. In some example embodiments, the sampling scheme may further include offset information (OFS).

The first sampling scheme may be a scheme of selecting a portion of a plurality of pixels include in the first format image. In some example embodiments, the first sampling scheme may reduce a size of the first format image. In this case, the first direction sampling information D1 and the second direction sampling information D2 may be the same. The second sampling scheme may be different from the first sampling scheme. For example, the second sampling scheme may select a portion of a plurality of pixels included in the second format image. In some embodiments, the second sampling scheme may reduce a size and change a shape of the second format image. In this case, the first direction sampling information D1 and the second direction sampling information D2 may be different.

The first format image may be generated by using the first sampling scheme, and the second format image may be generated by using the second sampling scheme. The new image generated by the sampling may be referred to as a feature map.

The apparatus for the artificial neural network may train the artificial neural network by using the first feature map and the second feature map (S5000).

That is, in the method for the artificial neural network according to an example embodiment, a first format image and a second format image may be generated based on an input image. A plurality of feature maps may be generated by sampling the first format image using the first sampling scheme and sampling the second format image using the second sampling scheme, with the second sampling scheme being different from the first sampling scheme. The artificial neural network may be trained using the feature maps. As a result, a recognition rate for a specific pattern by the artificial neural network may be increased.

Figure 2:
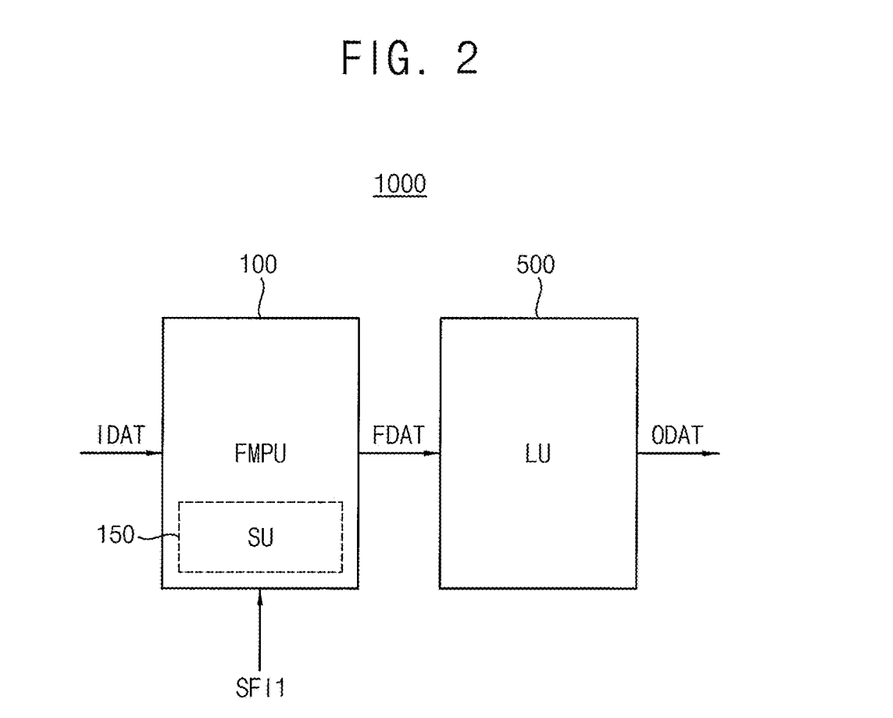
FIG. 2 is a block diagram illustrating an apparatus for the artificial neural network according to some example embodiments.

FIG. 2 is a block diagram illustrating an apparatus for the artificial neural network according to some example embodiments. FIG. 3 is a block diagram illustrating an example embodiment of a feature map providing unit included in the apparatus for the artificial neural network of FIG. 2.

Referring to FIG. 2, an apparatus for the artificial neural network 1000 may include a feature map providing unit (FMPU) 100 and a learning unit (LU) 500. The feature map providing unit 100 may include a format converter (FC) 130 and a sampling unit (SU) 150. The sampling unit 150 may include a first sampler (FS) 152 and a second sampler (SS) 154.

The format converter 130 may be configured to generate a first format image FM1 and a second format image FM2 based on an input image IDAT. The first format image FM1 may be an image obtained by processing the input image IDAT, and the second format image FM2 may be an image obtained by processing the input image IDAT and/or the first format image FM1. The input image may be, for example, an RGB image, an YCbCr image, and/or a YUV image. In some example embodiment, when the input image IDAT is the RGB image, the first format image FM1 may include a Red (R) image, a Green (G) image and a Blue (B) image, and the second format image FM2 may include an edge image generated based on at least one of the RGB image, the R image, the G image and/or the B image.

The sampling unit 150 may receive sampling information SFI1 including information on a sampling scheme. The sampling scheme may be a scheme for selecting a portion of a plurality of pixels included in the first format image and the second format image. The sampling information SFI1 may include information about the first sampling scheme and the second sampling scheme. In some embodiments, the first sampling scheme may correspond to the first format image FM1, and the second sampling scheme may correspond to the second format image FM2.

The sampling unit 150 may sample the first format image FM1 using the first sampling scheme to generate a first feature map, and sample the second format image FM2 using the second sampling scheme to generate a second feature map. The sampling unit 150 may output the first feature map and the second feature map as feature map data FDAT. The first feature map may be generated by the first sampler 152, and the second feature map may be generated by the second sampler 154. The first feature map and the second feature map may be generated in parallel and/or sequentially. For example, the first sampler 152 and the second sampler 154 may generate the first feature map and the second feature map in parallel and/or the sampling unit 150 may generate the first feature map and the second feature map in sequence.

The learning unit 500 may train the artificial neural network based on the first feature map and the second feature map. Hereinafter, the sampling scheme will be described in more detail.

In some embodiments, the sampling scheme may include first direction sampling information D1 and second direction sampling information D2, but the scope of the present invention is not limited thereto. In some embodiments, the sampling scheme may further include offset information (OFS).

Figure 4A:
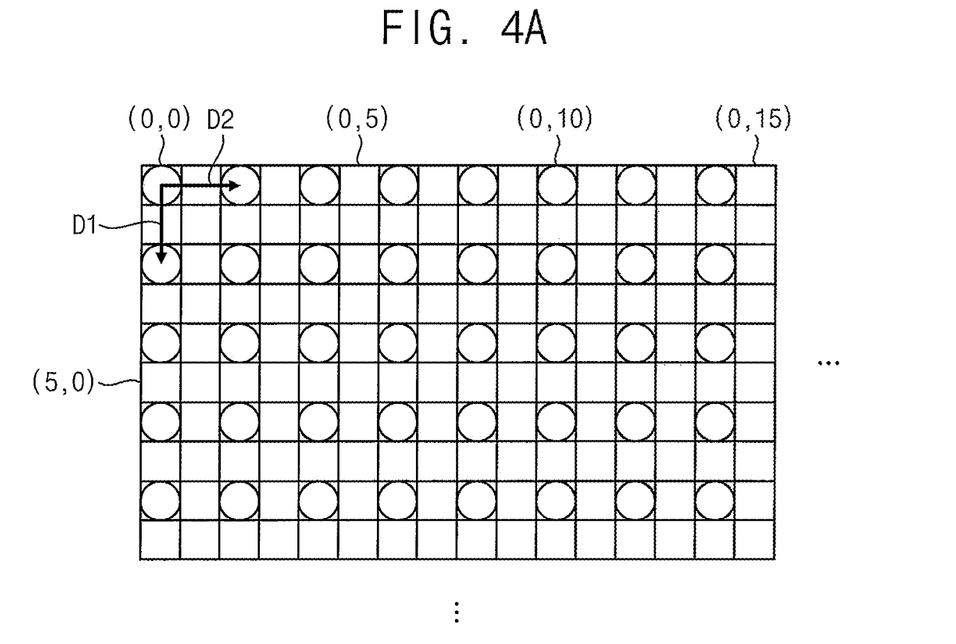
FIGS. 4A, 4B, and 4C are diagrams for describing some example embodiments of a sampling scheme according to sampling information.
Figure 4B:
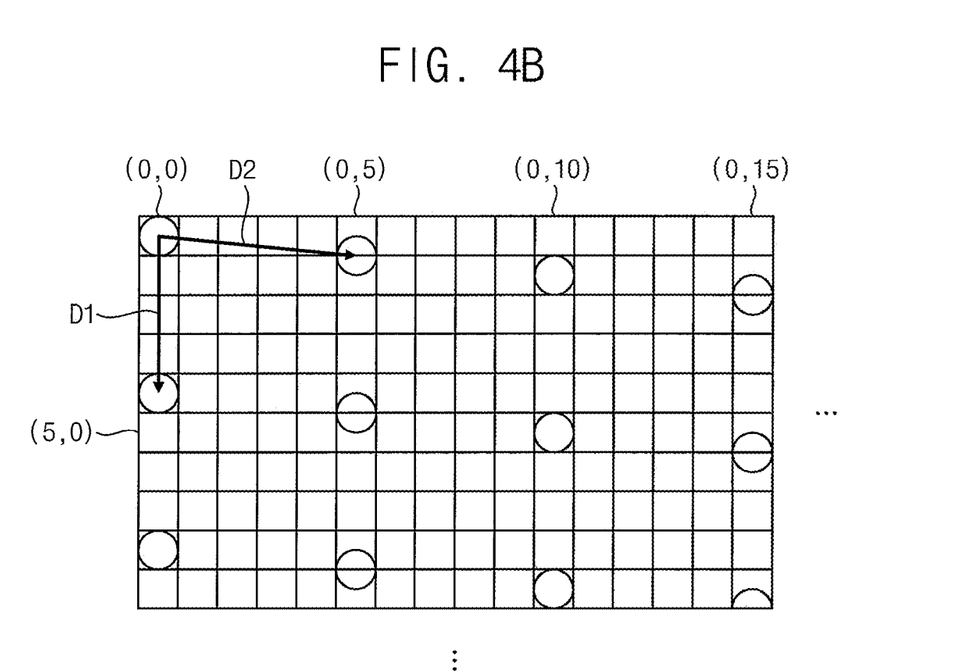
Figure 4C:
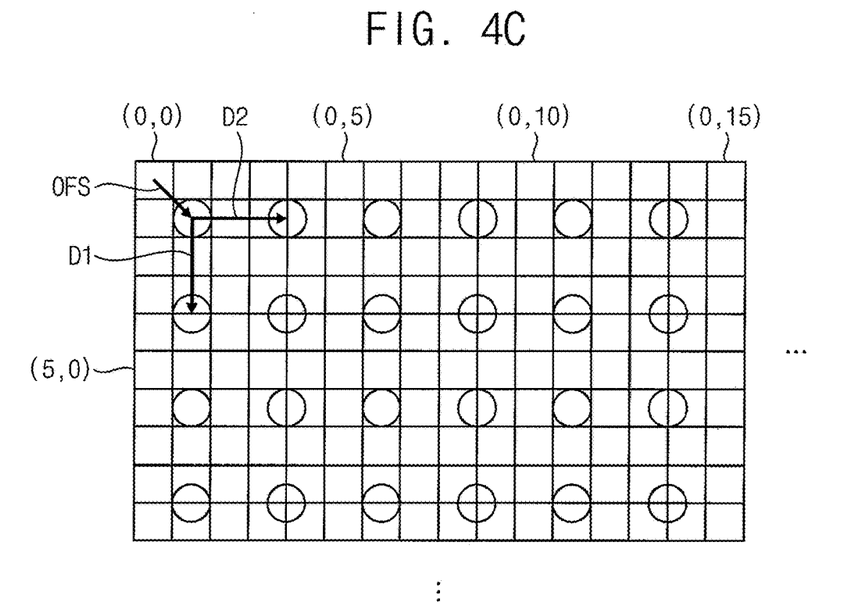

FIGS. 4A, 4B, and 4C are diagrams for describing some example embodiments of a sampling scheme according to sampling information.

In FIGS. 4A, 4B, and 4C, a portion of an image (e.g., 10×16 sized pixels) is illustrated to describe example embodiments of the sampling scheme. The image may be one of the first format image and the second format image described above with reference to FIGS. 1, 2, and 3. Though illustrated as including a 10×16 sized pixel array, the scope of the present invention is not limited thereto, and may, for example, include more or less pixels. In the illustrations, a portion of the image may include a plurality of pixel (e.g., 10×16 sized pixels) with each pixel represented by a square in the, and a portion of the plurality of pixels, (e.g., pixels represented by the square with a inscribed circle) represent pixels selected according to the sampling scheme. The sampling scheme may be a scheme for selecting a portion of a plurality of pixels included in the first format image and/or the second format image. The sampling scheme may include first direction sampling information D1 and second direction sampling information D2, but the scope of the present invention is not limited thereto. In some embodiments, the sampling scheme may further include offset information OFS.

Each of the first direction sampling information D1, the second direction sampling information D2 and the offset information OFS may be expressed in a vector format. In this case, a vector according to the vector format may be determined based on a relative position between pixels selected according to the sampling scheme.

Referring to FIG. 4A, the sampling scheme may include first direction sampling information D1 and second direction sampling information D2 (not illustrated). In some embodiments, the first direction sampling information D1 and the second direction sampling information D2 may include the same magnitude. For example, the vector format of the first direction sampling information D1 and the second direction sampling information may be orthogonal. Both the first direction sampling information D1 and the second direction sampling information may, skip a number of pixels to select a sampled pixel, for example, skipping every other pixel as represented by (0, 2) and (2, 0), respectively, but the scope of the present invention is not limited thereto. In some embodiments, the first direction sampling information D1 and the second direction sampling information D2 may be (0, −2) and (2, 0), respectively. In some embodiments, each of the first direction information D1 and the second direction sampling information D2 may be (0, −2) and (−2, 0), respectively. In this way, the size of the image may be reduced by the sampling scheme, but the shape of the image may be maintained.

Referring to FIG. 4B, the sampling scheme may include first direction sampling information D1 and second direction sampling information D2. In some embodiments, the vector format of the first direction sampling information D1 and the second direction sampling information D2 may include different magnitudes, and form a non-orthogonal angle, for example, as represented by (0, 4) and (5, 0.5), respectively, but the scope of the present invention is not limited thereto. In some embodiments, each of the first direction sampling information D1 and the second direction sampling information D2 may be (0, −4) and (5, 0.5), respectively. In some embodiments, each of the first direction information D1 and the second direction sampling information D2 may be (0, −4) and (−5, 0.5), respectively. In this way, the size of the image may be reduced and a shape of the image may be changed by the sampling scheme.

Referring to FIG. 4C, the sampling scheme may include first direction sampling information D1, second direction sampling information D2 and offset information OFS. In some embodiments, each of the first direction sampling information D1 and the second direction sampling information D2 may be (0, 2.5) and (2.5, 0), but the scope the present invention is not limited thereto. In some embodiments, each of the first direction sampling information D1 and the second direction sampling information D2 may be (0, −2.5) and (2.5, 0). In some embodiments, each of the first direction information D1 and the second direction sampling information D2 may be (0, −2.5) and (−2.5, 0). Further, the offset information OFS may be (1, 1). In the case where the vector format include the same magnitude, the size of the image may be reduced by the sampling scheme. However, in the case where the vector format includes different magnitudes, the size of the image may be reduced and a shape of the image may be changed by the sampling scheme.

As described above with reference to FIGS. 1, 2 and 3, the first sampling scheme may correspond to the first format image, and the second sampling scheme may correspond to the second format image. In some embodiments, each of the first sampling scheme and the second sampling scheme may select a portion of a plurality of pixels included in the first format image and/or the second format image. In this case, the first sampling scheme may be a scheme of reducing a size of the first format image, and second sampling scheme may be a scheme of changing a shape and reducing a size of the second format image. In some embodiments, the first sampling scheme may be one of the sampling schemes described above with reference to FIG. 4A or 4C, and the second sampling scheme may be one of the sampling schemes described above with reference to FIG. 4A, 4B, or 4C.

Figure 5:
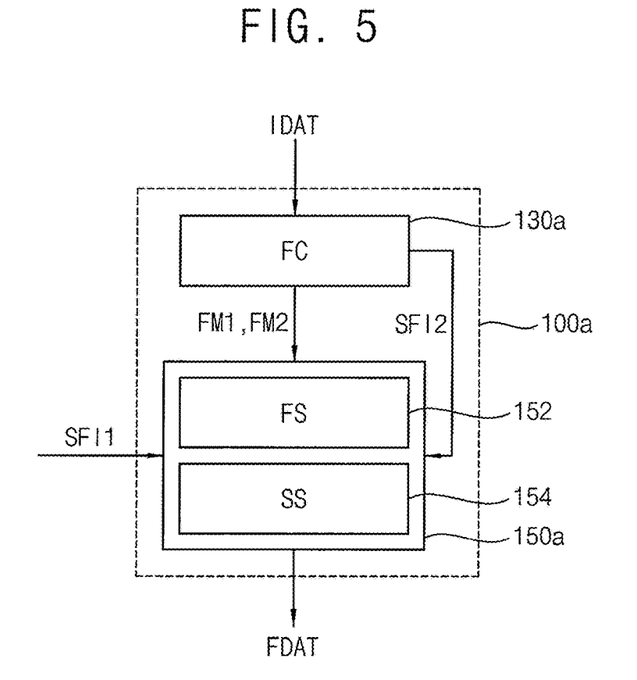
FIG. 5 is a block diagram illustrating an example embodiment of a feature map providing unit included in the apparatus for the artificial neural network of FIG. 2.

FIG. 5 is a block diagram illustrating an example embodiment of a feature map providing unit included in the apparatus for the artificial neural network of FIG. 2.

Figure 3:
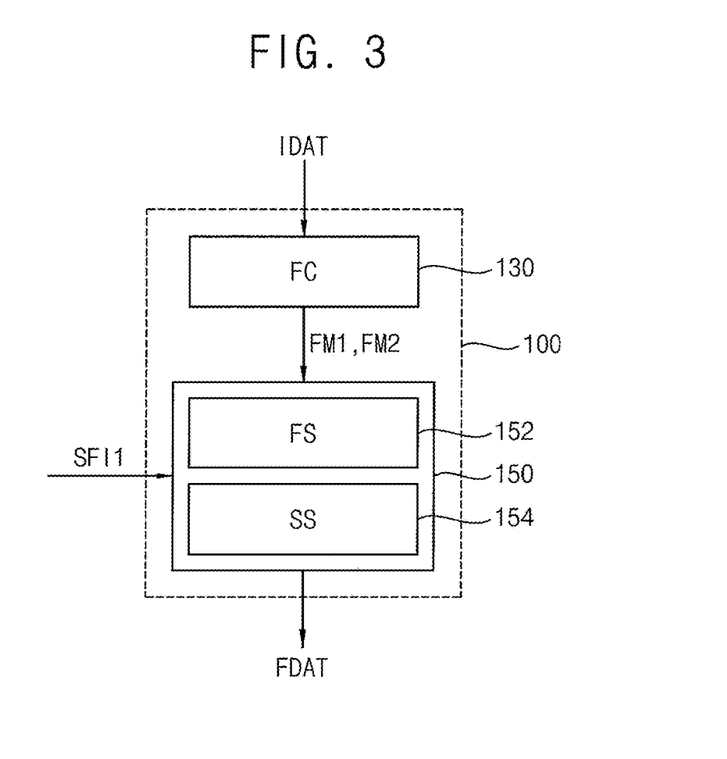
FIG. 3 is a block diagram illustrating an example embodiment of a feature map providing unit included in the apparatus for the artificial neural network of FIG. 2.

In FIG. 5, the feature map providing unit 100a performs a function similar to the feature map providing unit 100 illustrated in FIG. 3, except that the format converter (FC) 130a further generates sampling information SFI2 and transmits the sampling information SFI2 to a sampling unit 150a. Hereinafter, overlapping descriptions will be omitted.

Referring to FIG. 5, the feature map providing unit 100a may include the format converter (FC) 130a and the sampling unit 150a, and the sampling unit 150a includes a first sampler (FS) 152 and a second sampler (SS) 154. The format converter 130a may be configured to generate a first format image FM1 and a second format image FM2 based on an input image IDAT. The first format image FM1 may be an image obtained by processing the input image IDAT, and the second format image FM2 may be an image obtained by processing the input image IDAT or the first format image FM1. The input image may be an RGB image, an YCbCr image, or a YUV image. In some embodiments, when the input image IDAT is the RGB image, the first format image FM1 may include an Red (R) image, a Green (G) image and a Blue (B) image, and the second format image FM2 may be an edge image generated based on at least one of the input image IDAT and the first format image FM1.

The format converter 130a may generate sampling information SFI2 based on the second format image FM2. The sampling information SFI2 may include information about the second sampling scheme. That is, the format converter 130a may generate the sampling information SFI2 for sampling the second format image FM2 according to the second sampling scheme. Hereinafter, the sampling scheme according to the sampling information SFI2 generated by the format converter 130a will be described in more detail.

Figure 6:
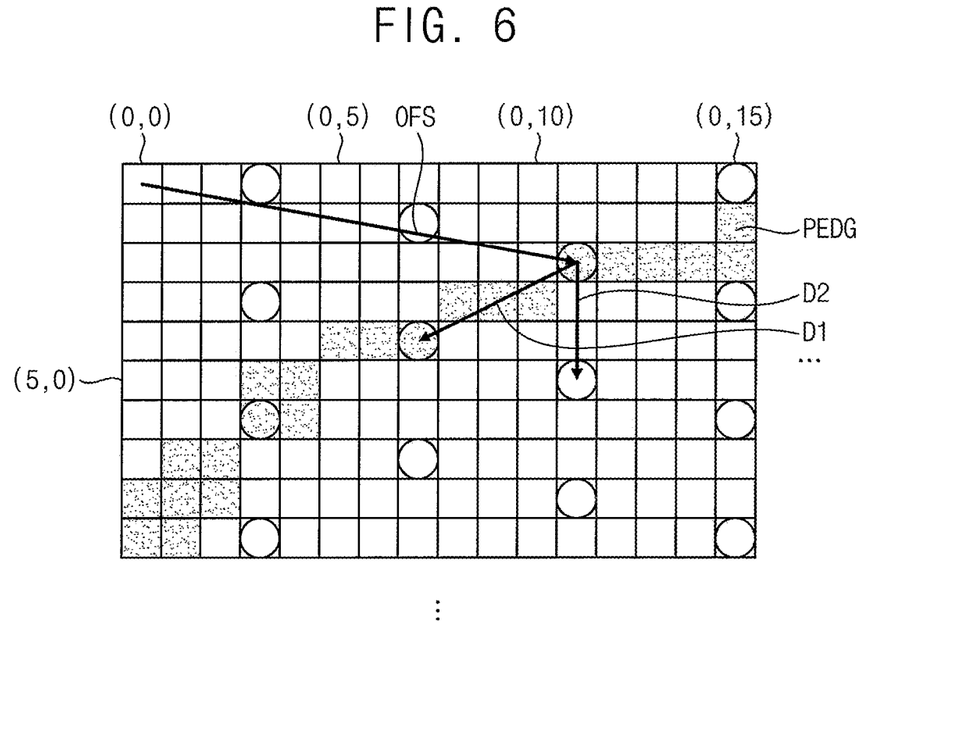
FIG. 6 is a diagram for describing an example embodiment of a sampling scheme according to sampling information generated by a format converter included in the apparatus for the artificial neural network of FIG. 2.

FIG. 6 is a diagram for describing an example embodiment of a sampling scheme according to sampling information generated by a format converter included in the apparatus for the artificial neural network of FIG. 2.

In FIG. 6, a portion of an image (e.g., 10×16 sized pixels) is illustrated to describe an example embodiment of the sampling scheme. Though illustrated as including a 10×16 sized pixel array, the scope of the present invention is not limited thereto, and may, for example, include more or less pixels. In the illustrations, the image may be one of the second format image FM2 described above with reference to FIGS. 1, 2, and 3. A portion of the image may include a plurality of pixels (e.g., 10×16 sized pixels) represented by a square, a portion of the plurality of pixels (e.g., pixels represented by the square with a inscribed circle) represent pixels selected according to the sampling scheme, and a portion of the plurality of pixels, (e.g., pixels represented by the square filled inside) represent an edge pixels present in the second format image FM2.

The sampling scheme may select a portion of a plurality of pixels included in the second format image FM2 using a scheme. In some example embodiments, the sampling scheme may include first direction sampling information D1 and second direction sampling information D2, but the scope of the present invention is not limited thereto. In some example embodiments, the sampling scheme may further include offset information OFS.

Each of the first direction sampling information D1, the second direction sampling information D2 and the offset information OFS may be expressed in a vector format. In this case, a vector according to the vector format may be determined based on a relative position between pixels selected according to the sampling scheme.

Referring to FIG. 6, the sampling scheme may include first direction sampling information D1 and second direction sampling information D2 and offset information OFS. The first direction sampling information D1 may be determined based on gradient values of edge pixels in the second format image. The gradient values may be generated by applying a mask to the second format image. The mask applied to the second format image FM2 may be, for example, a Sobel mask and/or predetermined before the sampling scheme is applied.

In some example embodiments, the first direction sampling information D1 may be determined based on a gradient value of a highest frequency among the gradient values of the edge pixels in the second format image. In some example embodiments, the second direction sampling information D2 may be determined based on a gradient value of a lowest frequency among the gradient values of the edge pixels in the second format image.

In some example embodiments, the first direction sampling information D1 and the second direction sampling information D2 may be (−4, 2) and (0, 3), respectively, but the scope of the present invention is not limited thereto. For example, in some embodiments, the first direction sampling information D1 and the second direction sampling information D2 may be (−4, 2) and (0, −3), respectively. In some embodiments, the first direction sampling information D1 and the second direction sampling information D2 may be (4, −2) and (0, −3), respectively. In some embodiments, each of the first direction sampling information D1 and the second direction sampling information D2 may be (4, −2) and (0, −3), respectively. In this way, a size of the second format image FM2 may be reduced and a shape of the second format image FM2 may be changed by the sampling scheme.

The offset information OFS may be determined based on coordinate values of each of the first direction sampling information D1, the second direction sampling information D2 and edge pixels PEDG. In some embodiments, the offset information OFS may be determined based on coordinate values of edge pixels corresponding to a gradient value corresponding to the first direction sampling information D1.

FIGS. 7A, 7B, 7C, and 8 are diagrams for describing some example embodiments of pixel regions in which different sampling schemes may be used.

Figure 7A:
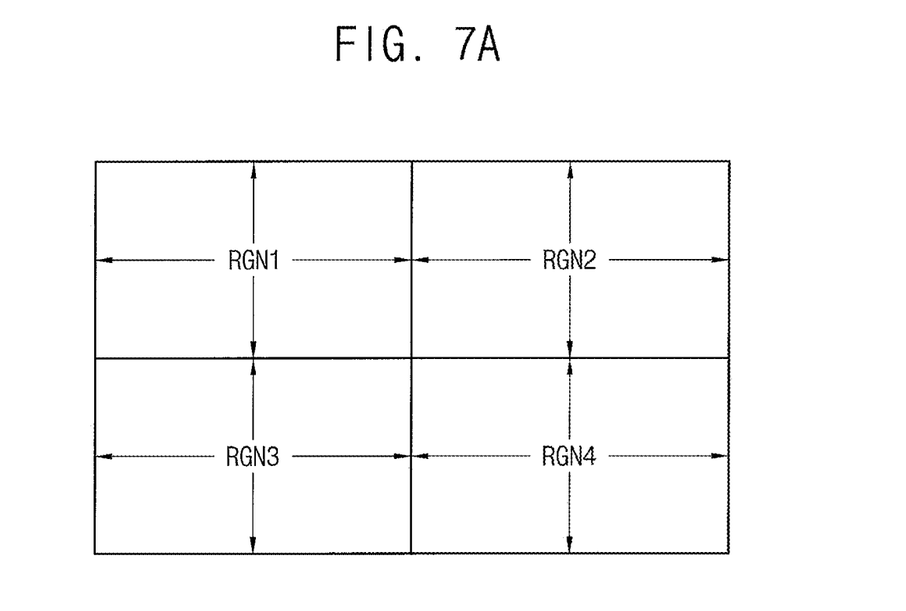
FIGS. 7A, 7B, 7C, and 8 are diagrams for describing some example embodiments of pixel regions in which different sampling schemes may be used.

Referring to FIG. 7A, a region of an input image IDAT may include a plurality of regions RGN1, RGN2, RGN3, and RGN4. The regions may also be referred to as sub images. Each of the plurality of regions RGN1, RGN2, RGN3, and RGN4 may comprise a same shape and size, and each of the plurality of regions RGN1, RGN2, RGN3, and RGN4 may be distinct from others of the plurality of regions RGN1, RGNS2, RGN3, and RGN4, and may, therefore, not include overlapping pixels. In some example embodiments, each of the plurality of regions RGN1, RGN2, RGN3, and RGN4 may be sampled by one of the sampling schemes described above with reference to FIGS. 4A, 4B, 4C, and 6. For example, each of plurality of regions RGN1, RGN2, RGN3, and RGN4 may be sampled by the same sampling scheme or each of the plurality of regions RGN1, RGN2, RGN3, and RGN4 may be sampled using different sampling scheme for each of the plurality of regions RGN1, RGN2, RGN3, and RGN4. The different sampling schemes may be a different one of the sampling schemes described above with reference to FIGS. 4A, 4B, 4C, and 6 and/or include different magnitudes for the vectors of first and/or second direction sampling information.

Figure 7B:
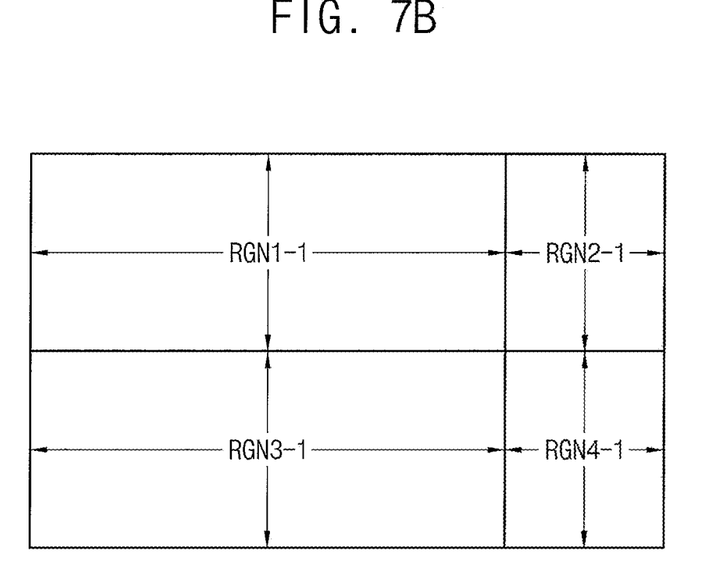

Referring to FIG. 7B, a region of an input image IDAT may include a plurality of regions RGN1-1, RGN2-1, RGN3-1, and RGN 4-1. The plurality of regions RGN1-1, RGN2-1, RGN3-1, and RGN 4-1 may comprise different sizes, but the same shape, and each of the plurality of regions RGN1-1, RGN2-1, RGN3-1, and RGN 4-1 may be distinct from others of the plurality of regions RGN1, RGNS2, RGN3, and RGN4, and may, therefore, not include overlapping pixels. In some embodiments, each of the plurality of regions RGN1-1, RGN2-1, RGN3-1, and RGN 4-1 may be sampled by one of the sampling schemes described above with reference to FIGS. 4A, 4B, 4C, and 6.

Figure 7C:
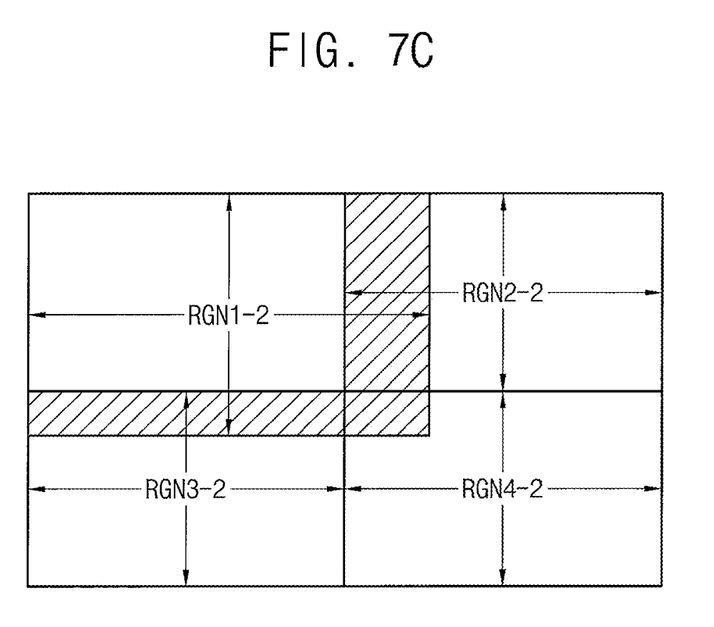

Referring to FIG. 7C, a region of an input image IDAT may include a plurality of regions RGN1-2, RGN2-2, RGN3-2, and RGN 4-2. The plurality of regions RGN1-2, RGN2-2, RGN3-2, and RGN 4-2 may include a same shape and a different size, and the plurality of regions RGN1-2, RGN2-2, RGN3-2, and RGN 4-2 may include overlapping pixels. In some embodiments, each of the plurality of regions RGN1-2, RGN2-2, RGN3-2, and RGN 4-2 may be sampled by one of the sampling schemes described above with reference to FIGS. 4A, 4B, 4C, and 6.

Figure 8:
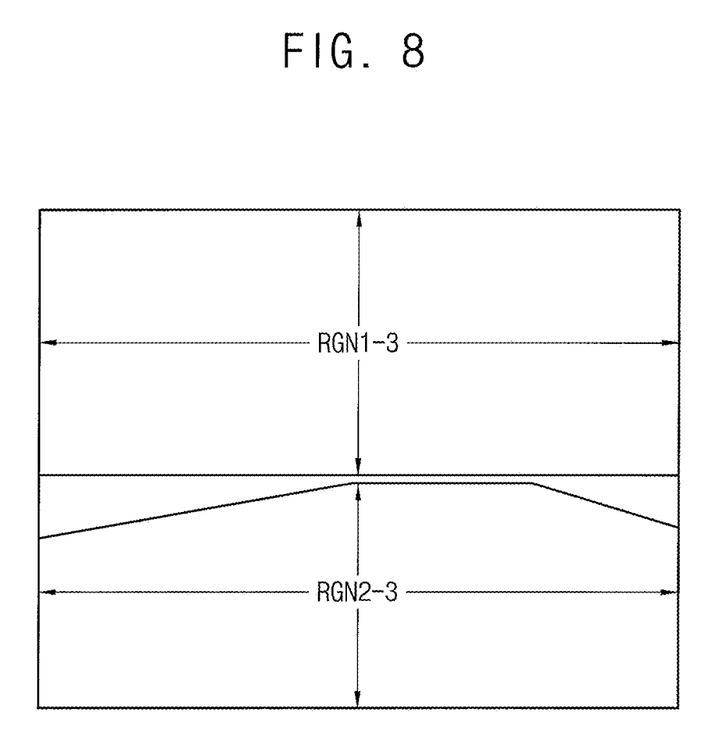

Referring to FIG. 8, a region of an input image IDAT may include a plurality of regions RGN1-3 and RGN2-3. The plurality of regions RGN1-3 and RGN2-3 may comprise a different shape and a different size, and each of the plurality of regions RGN1-3 and RGN2-3 does not include overlapping pixels. In some example embodiments, each of the plurality of regions RGN1-3 and RGN2-3 may be sampled by one of the sampling schemes described above with reference to FIGS. 4A, 4B, 4C, and 6.

The plurality of regions described above with reference to FIGS. 7A, 7B, 7C, and 8 may be sampled using different sampling schemes by the sampling unit 150 illustrated in FIGS. 2 and 3, but the scope of the present invention is not limited thereto.

Figure 9:
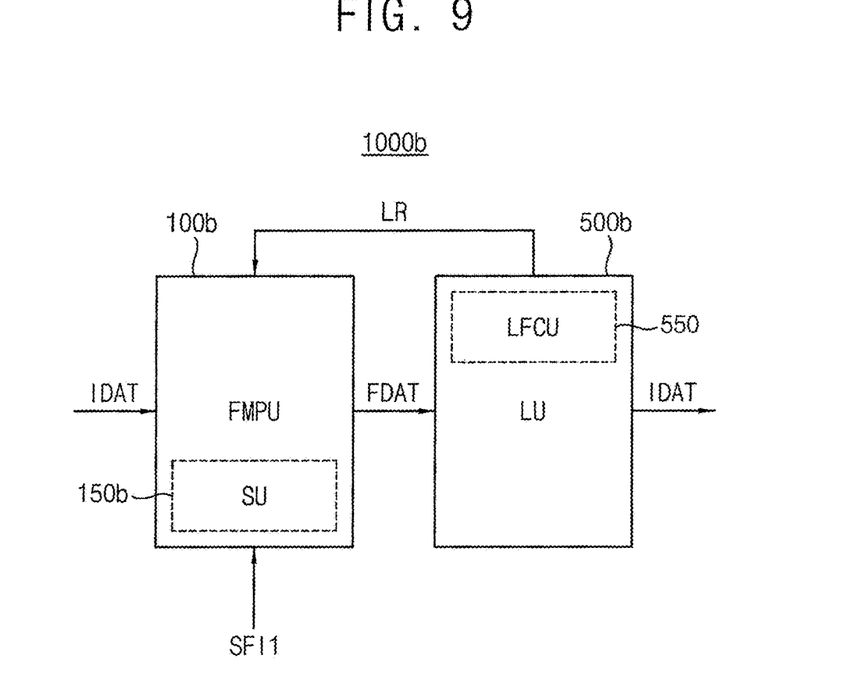
FIG. 9 is a block diagram illustrating an apparatus for the artificial neural network according to some example embodiments.
Figure 10:
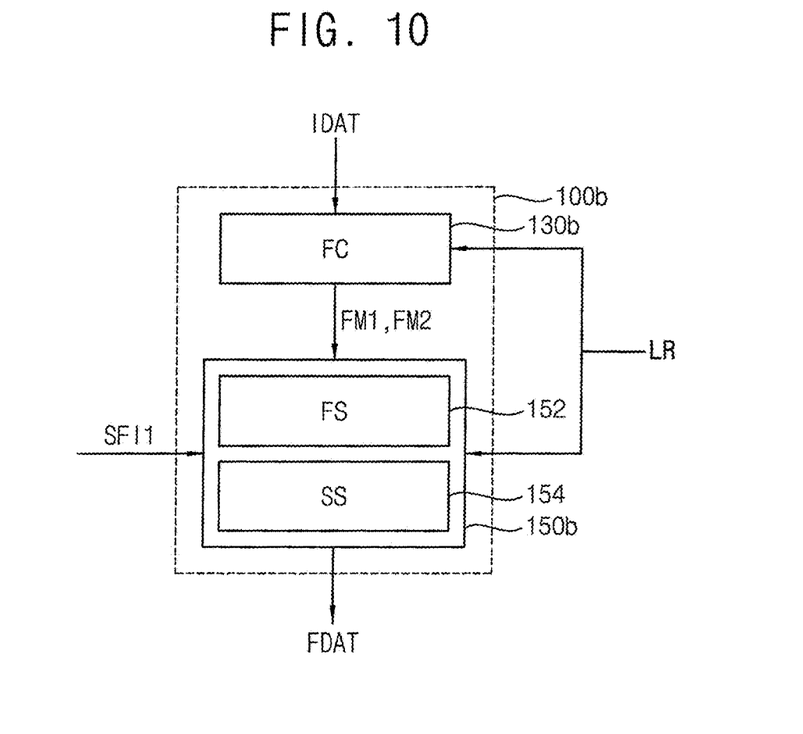
FIG. 10 is a block diagram illustrating an example embodiment of a feature map providing unit included in the apparatus for the artificial neural network of FIG. 9.

FIG. 9 is a block diagram illustrating an apparatus for the artificial neural network according to some example embodiments. FIG. 10 is a block diagram illustrating an example embodiment of a feature map providing unit included in the apparatus for the artificial neural network of FIG. 9.

Referring to FIGS. 9 and 10, an apparatus for the artificial neural network 1000b may include a feature map providing unit (FMPU) 100b and a learning unit (LU) 500b.

The feature map providing unit 100a may include a format converter (FC) 130b and a sampling unit (SU) 150b, and the sampling unit 150b may include a first sampler (FS) 152 and a second sampler (SS) 154. The learning unit (LU) 500b may include a loss function calculation unit (LFCU) 550.

The format converter 130b may generate a first format image FM1 and a second format image FM2 based on an input image IDAT. The first format image FM1 may be an image obtained by processing the input image IDAT, and the second format image FM2 may be an image obtained by processing the input image IDAT or the first format image FM1.

The sampling unit 150b may receive sampling information SF1, including information on a sampling scheme, from the outside. The sampling scheme may be a scheme of selecting a portion of a plurality of pixels included in the first format image FM1 and the second format image FM2 according to a scheme. The sampling information SF1 may include information about a first sampling scheme and a second sampling scheme. In some example embodiments, the first sampling scheme may correspond to the first format image FM1, and the second sampling scheme may correspond to the second format image FM2. The sampling unit 150b may sample the first format image FM1 using the first sampling scheme to generate a first feature map, and sample the second format image FM2 using the second sampling scheme to generate a second feature map. The sampling unit 150b may output the first feature map and the second feature map as feature map data FDAT. The first sampler 152 may be configured to generate the first feature map, and the second sampler 154 maybe configured to generate the second feature map.

The learning units 500 and 500b may be configured to operate the apparatus for the artificial neural network using the first feature map and the second feature map and to drive a neural network system and/or a machine learning system such as an artificial neural network (ANN) system, a convolutional neural network (CNN) system, a deep neural network (DNN) system, a deep learning system, deconvolutional neural networks (DCNN), recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

Alternatively and/or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests.

The loss function calculation unit 550 may be configured to generate error information based on the input image IDAT and an operation result of the artificial neural network. The loss function calculation unit 550 may use one of a mean squared error MSE or a cross entropy error CEE to calculate an error, however the scope of the present invention is not limited thereto. The loss function calculation unit 550 may generate the error information LR based on the error, and transmit the error information LR to the feature map providing unit 100a.

The format converter 130b and the sampling unit 150b may be configured to receive the error information LR transmitted to the feature map providing unit 100b. The format converter 130b may be configured to generate the first format image FM1 and the second format image FM2 from the input image IDAT based on the error information LR.

The sampling unit 150b may be configured to change the first sampling scheme and the second sampling scheme based on the error information LR. The sampling unit 150b may be configured to sample the first format image FM1 using the changed first sampling scheme to generate the first feature map, and sample the second format image FM2 using the changed second sampling scheme to generate the second feature map.

The functional units like the format converter 130, 130a, and 130b, sampling units 150, 150a, and 150b, the learning units 500, 500a, and 500b, and loss function calculation unit 550 described above, may include processing circuitry such hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. The feature map providing unit 100 and the learning unit (LU) 500 may comprise, for example, include first processing circuitry and second processing circuitry, respectively.

Figure 11:
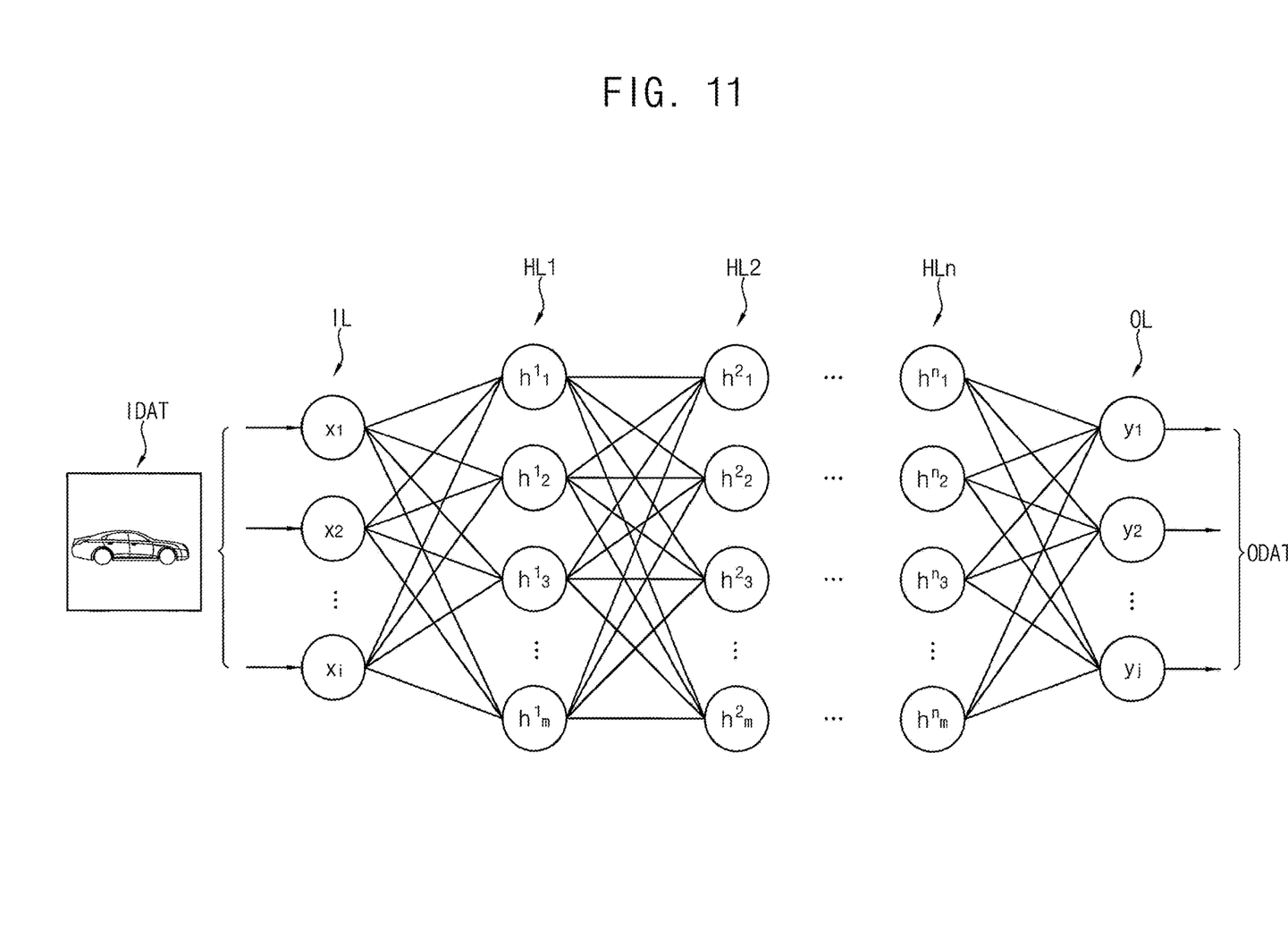
FIGS. 11, 12, and 13 are diagrams for describing some example embodiments of a network structure used for performing deep learning by an apparatus for the artificial neural network according to example embodiments.
Figure 12:
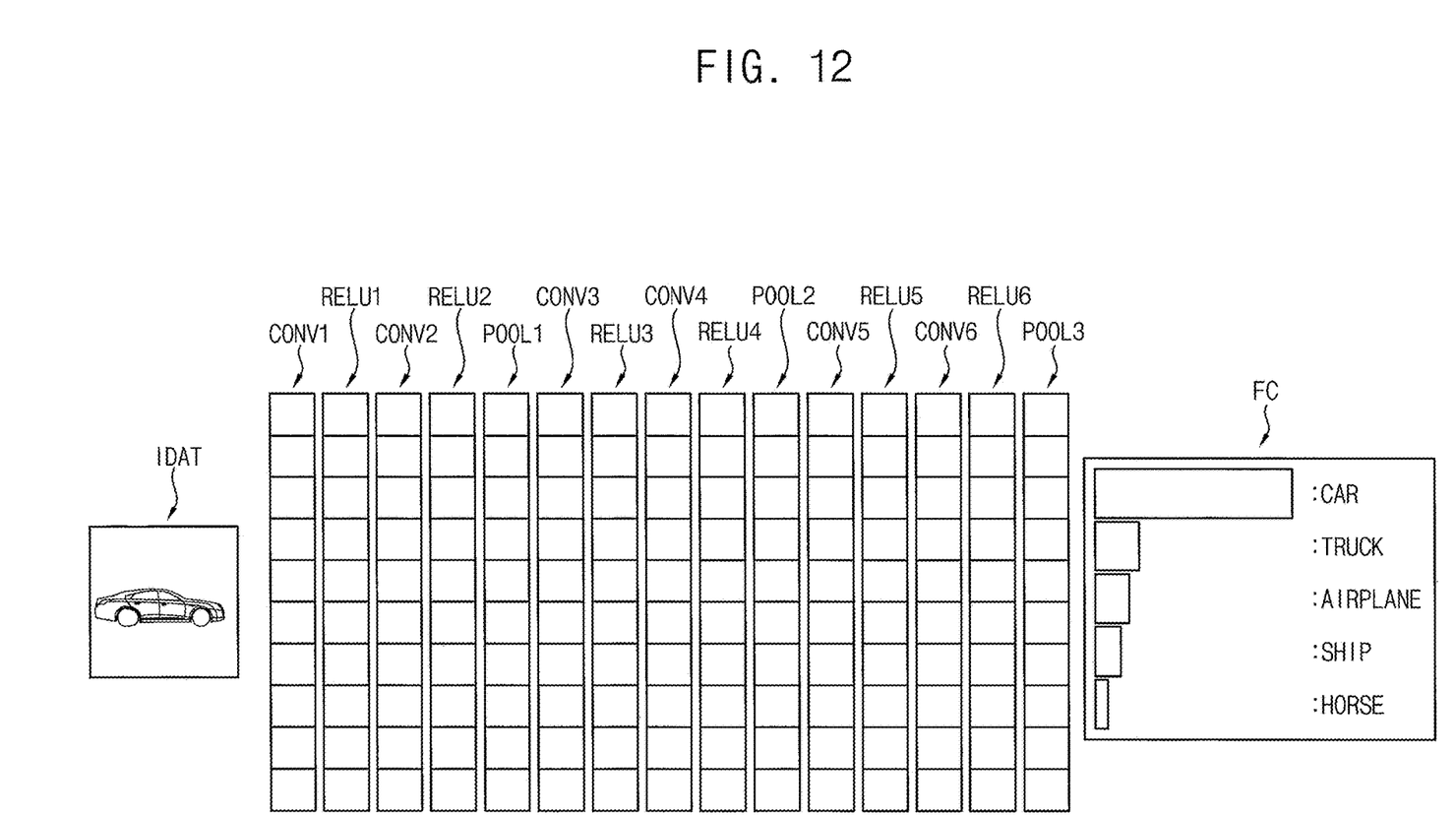
Figure 13:
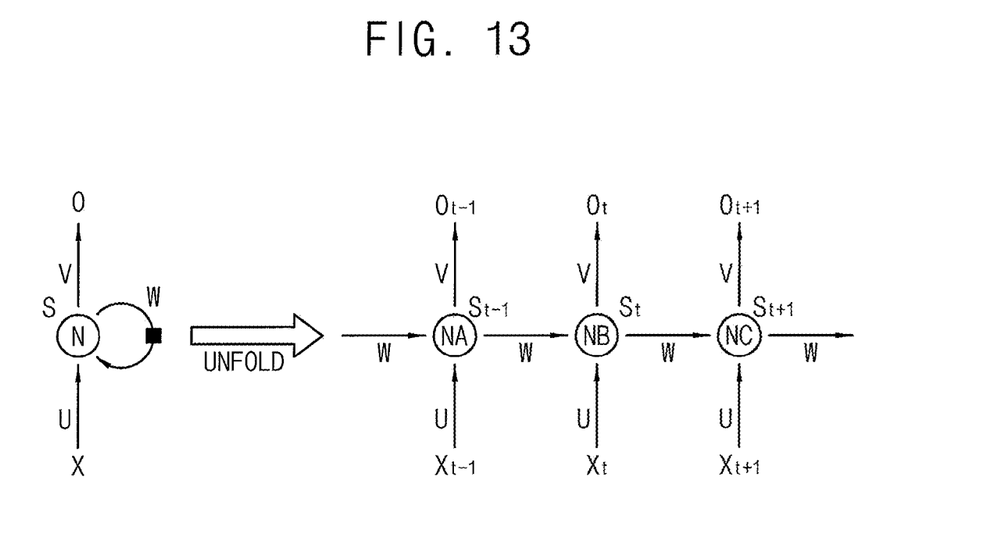

FIGS. 11, 12, and 13 are diagrams for describing some example embodiments of a network structure used for performing deep learning by an apparatus for the artificial neural network according to example embodiments.

Referring to FIG. 11, a general neural network (e.g., an ANN) may include an input layer IL, a plurality of hidden layers HL1, HL2 . . . HLn, and an output layer OL.

The input layer IL may include i input nodes $x_1, x_2 \ldots x_i$, where i is a natural number. Input data (e.g., vector input data) IDAT whose length is i may be input to the input nodes $x_1, x_2 \ldots x_i$ such that each element of the input data IDAT is input to a respective one of the input nodes $x_1, x_2 \ldots x_i$.

The plurality of hidden layers HL1, HL2 HLn may include n hidden layers, where n is a natural number, and may include a plurality of hidden nodes $h^1_1, h^1_2, h^1_3 \ldots h^1_m$; $h^2_1, h^2_2, h^2_3 \ldots h^2_m$; $h''_1, h''_2, h''_3 \ldots h''_m$. For example, the hidden layer HL1 may include m hidden nodes $h^1_1, h^1_2, h^1_3 \ldots h^1_m$, the hidden layer HL2 may include m hidden nodes $h^2_1, h^2_2, h^2_3 \ldots h^2_m$, and the hidden layer HLn may include m hidden nodes $h''_1, h''_2, h''_3 \ldots h''_m$, where m is a natural number.

The output layer OL may include j output nodes $y_1, y_2 \ldots y_j$, where j is a natural number. Each of the output nodes $y_1, y_2 \ldots y_j$ may correspond to a respective one of classes to be categorized. The output layer OL may be configured to output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 11 may be represented by information on branches and/or connections between nodes illustrated as lines, and a weighted value assigned to each branch, which is not illustrated. Nodes within one layer may not be connected to one another, but nodes of different layers may be fully or partially connected to one another.

Each node (e.g., the node $h^1_1$) may be configured to receive an output of a previous node (e.g., the node $x_1$), to perform a computing operation, computation and/or calculation on the received output, and to output a result of the computing operation, computation and/or calculation as an output to a next node (e.g., the node $h^2_1$). Each node may be configured to calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 11 may not be suitable for handling input image data (or input sound data) because each node (e.g., the node $h^1_1$) is connected to all nodes of a previous layer (e.g., the nodes $x_1, x_2, \ldots, x_i$ included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the CNN.

Referring to FIG. 12, a CNN may include a plurality of layers CONV1, RELU1, CONV2, RELU2, POOL1, CONV3, RELU3, CONV4, RELU4, POOL2, CONV5, RELU5, CONV6, RELU6, POOL3, and FC.

Unlike the general neural network, each layer of the CNN may have three dimensions of width, height, and depth, and thus data that is input to each layer may be volume data having three dimensions of width, height, and depth. For example, if an input image in FIG. 12 has a size of 32 widths (e.g., 32 pixels) and 32 heights and three color channels R, G, and B, input data IDAT corresponding to the input image may have a size of 32*32*3. The input data IDAT in FIG. 12 may be referred to as input volume data or input activation volume.

Each of convolutional layers CONV1, CONV2, CONV3, CONV4, CONV5, and CONV6 may be configured to perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window, or kernel.

Particularly, parameters of each convolutional layer may consist of a set of learnable filters. Every filter may be small spatially (along width and height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of the rectified linear unit (RELU) layers RELU1, RELU2, RELU3, RELU4, RELU5, and RELU6 may perform an RELU operation that corresponds to an activation function defined by, e.g., a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2, and POOL3 may be configured to perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the CNN, pairs of the CONV/RELU layers may be repeatedly arranged in the CNN, and the pooling layer may be periodically inserted in the CNN, thereby reducing a spatial size of image and extracting a characteristic of image.

An output layer and/or a fully-connected layer FC may be configured to output results (e.g., class scores) of the input volume data IDAT for each of the classes. For example, the input volume data IDAT corresponding to the two-dimensional image may be converted into a one-dimensional matrix or vector as the convolutional operation and the down-sampling operation are repeated. The fully-connected layer FC may represent probabilities that the input volume data IDAT corresponds to a categorization and/or identification, for example a car, a truck, an airplane, a ship and a horse.

The types and number of layers included in the CNN may not be limited to the example embodiment described with reference to FIG. 12 and may be, for example, changed according to the example embodiments. In addition, although not illustrated in FIG. 12, the CNN may further include other layers such as a softmax layer for converting score values corresponding to predicted results into probability values, a bias adding layer for adding at least one bias, or the like.

Referring to FIG. 13, a recurrent neural network (RNN) may include a repeating structure using a specific node or cell N illustrated on the left side of FIG. 13.

A structure illustrated on the right side of FIG. 13 may represent that a recurrent connection of the RNN illustrated on the left side is unfolded (or unrolled). The term "unfolded" means that the network is written out or illustrated for the complete or entire sequence including all nodes NA, NB, and NC. For example, if the sequence of interest is a sentence of 3 words, the RNN may be unfolded into a 3-layer neural network, one layer for each word (e.g., without recurrent connections and/or without cycles).

In the RNN in FIG. 13, X represents an input of the RNN. For example, $X_t$ may be an input at time step t, and $X_{t-1}$ and $X_{t+1}$ may be inputs at time steps t−1 and t+1, respectively.

In the RNN in FIG. 13, S represents a hidden state. For example, $S_t$ may be a hidden state at the time step t, and $S_{t-1}$ and $S_{t+1}$ may be hidden states at the time steps t−1 and t+1, respectively. The hidden state may be calculated based on a previous hidden state and an input at a current step. For example, $S_t = f(UX_t + WS_{t-1})$. For example, the function f may be usually a nonlinearity function such as tanh or RELU. $S_{-1}$, which is required to calculate a first hidden state, may be typically initialized to all zeroes.

In the RNN in FIG. 13, O represents an output of the RNN. For example, $O_t$ may be an output at the time step t, and $O_{t-1}$ and $O_{t+1}$ may be outputs at the time steps t−1 and t+1, respectively. For example, if it is required to predict a next word in a sentence, it would be a vector of probabilities across a vocabulary, for example, $O_t = \text{softmax}(VS_t)$.

In the RNN in FIG. 13, the hidden state may be a "memory" of the network. In other words, the RNN may have a "memory" which captures information about what has been calculated so far. The hidden state $S_t$ may capture information about what happened in all the previous time steps. The output $O_t$ may be calculated solely based on the memory at the current time step t. In addition, unlike a traditional neural network, which uses different parameters at each layer, the RNN may share the same parameters (e.g., U, V, and W in FIG. 13) across all time steps. This may represent the fact that the same task may be performed at each step, just with different inputs. This may greatly reduce the total number of parameters required to be trained or learned.

In some example embodiments, at least one of various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by the neural network system described with reference to FIGS. 11, 12, and 13.

Figure 14:
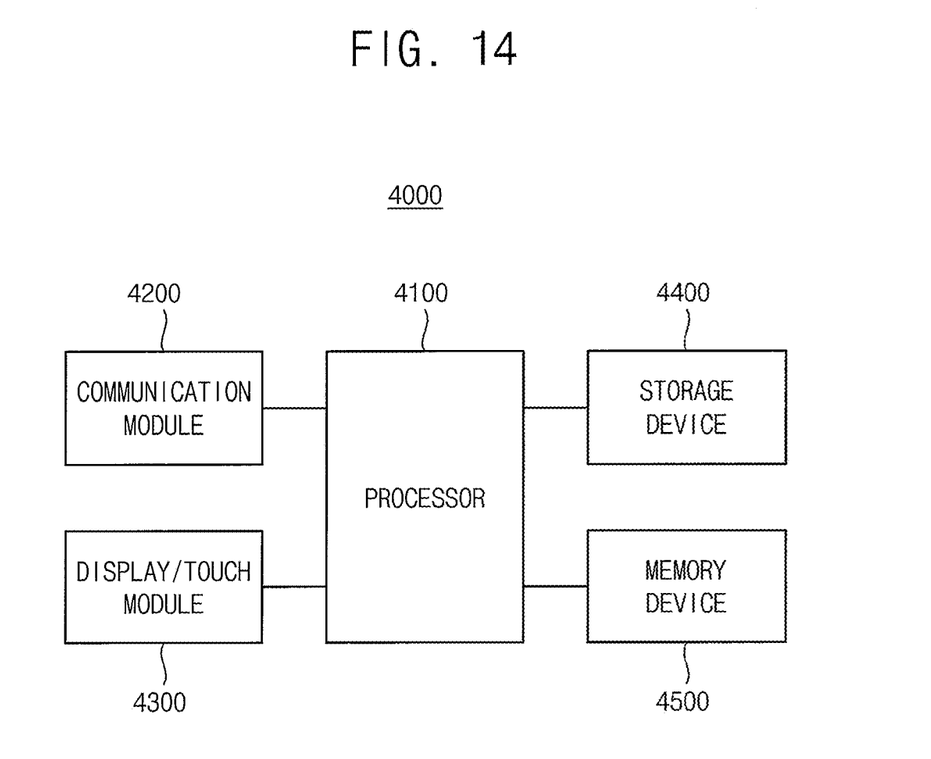
FIG. 14 is a block diagram illustrating an electronic system according to some example embodiments.

FIG. 14 is a block diagram illustrating an electronic system according to some example embodiments.

Referring to FIG. 14, an electronic system 4000 includes at least one processor 4100, a communication module 4200, a display/touch module 4300, a storage device 4400, and a memory device 4500. For example, the electronic system 4000 may be included in a mobile system and/or a computing system.

The processor 4100 controls operations of the electronic system 4000. The processor 4100 may execute an OS and at least one application to provide an internet browser, games, videos, or the like. The communication module 4200 performs wireless or wire communications with an external system. The display/touch module 4300 displays data processed by the processor 4100 and/or receives data through a touch panel. The storage device 4400 stores user data. The memory device 4500 temporarily stores data used for processing the operations of the electronic system 4000. The processor 4100 may correspond to the apparatus for the artificial neural network in FIG. 2.

As described above, a method and an apparatus for an artificial neural network may generate a first format image and a second format image based on an input image. The method and the apparatus may generate various feature maps by sampling the first format image using the first sampling scheme, and sampling the second format image using the second sampling scheme. The method and the apparatus may operate the artificial neural network using the first feature map and the second feature map. As a result, it is possible to increase the recognition rate for specific patterns of the artificial neural network.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An apparatus for an artificial neural network, the apparatus comprising:
processing circuitry configured to
generate a first format image and a second format image based on an input image;
sample the first format image using a first sampling scheme to generate a first feature map, and sample the second format image using a second sampling scheme different from the first sampling scheme to generate a second feature map; and
operate the artificial neural network using the first feature map and the second feature map.

2. The apparatus of claim 1, wherein the first format image includes a Red (R) image, a Green (G) image and a Blue (B) image when the input image is an RGB image, and the second format image is an edge image generated based on at least one of the input image and the first format image.

3. The apparatus of claim 2, wherein the processing circuitry is configured to generate the edge image by applying a mask to at least one of the input image and the first format image.

4. The apparatus of claim 3, wherein the mask is at least one of a Sobel mask, a Prewitt mask, a Robert mask, a Laplacian, a Laplacian Of Gaussian (LOG), or a Difference Of Gaussian (DOG).

5. The apparatus of claim 1, wherein each of the first sampling scheme and the second sampling scheme includes first direction sampling information, second direction sampling information, and offset information.

6. The apparatus of claim 1, wherein the processing circuitry is configured to select a portion of a plurality of pixels included in the first format image using the first sampling scheme, and selects a portion of a plurality of pixels included in the second format image using the second sampling scheme.

7. The apparatus of claim 1, wherein the processing circuitry is configured to generate the first feature map by reducing a size of the first format image, and to generate the second feature map by changing a shape of and reducing a size of the second format image.

8. The apparatus of claim 1, wherein the processing circuitry is configured to
generate sampling information, and
sample the second format image using the second sampling scheme based on the sampling information.

9. The apparatus of claim 8, wherein
the sampling information includes first direction sampling information, second direction sampling information and offset information, and
the sampling information is in a vector format.

10. The apparatus of claim 9, wherein the processing circuitry is configured to determine the first direction sampling information and the second direction sampling information based on gradient values of edge pixels in the second format image.

11. The apparatus of claim 10, wherein the processing circuitry is configured to determine the first direction sampling information based on a gradient value of a highest frequency among the gradient values of the edge pixels in the second format image.

12. The apparatus of claim 10, wherein the processing circuitry is configured to determine the second direction sampling information based on a gradient value of a lowest frequency among the gradient values of the edge pixels in the second format image.

13. The apparatus of claim 1, wherein the processing circuitry is configured to determine a plurality of sub images of the input image, and to sample each of the plurality of sub images.

14. The apparatus of claim 13, wherein the plurality of sub images have a same shape and a same size, and do not share overlapping regions.

15. The apparatus of claim 13, wherein the plurality of sub images have a same shape, a different size, and do not share overlapping regions.

16. The apparatus of claim 13, wherein the plurality of sub images have a same shape, a different size, and include overlapping regions.

17. The apparatus of claim 13, wherein the plurality of sub images have a different shape and a different size, and do not share overlapping regions.

18. The apparatus of claim 1, wherein the processing circuitry is configured to generate error information based on the input image and an operation result of the artificial neural network.

19. An apparatus for an artificial neural network, the apparatus comprising:
first processing circuitry configured to generate a first format image and a second format image based on an input image, to generate a first feature map by sampling the first format image using a first sampling scheme, and to generate a second feature map by sampling the second format image using a second sampling scheme different from the first sampling scheme; and
second processing circuitry configured to operate the artificial neural network using the first feature map and the second feature map, generate error information by calculating an error based on the input image and an operation result of the artificial neural network, and transmit the error information to the first processing circuitry.

20. A method for an artificial neural network, the method comprising:
generating a first format image and a second format image based on an input image;
sampling the first format image using a first sampling scheme to generate a first feature map, and sampling the second format image using a second sampling scheme different from the first sampling scheme to generate a second feature map; and
operating the artificial neural network using the first feature map and the second feature map.

* * * * *